(12) United States Patent
Peng et al.

(10) Patent No.: US 9,325,246 B1
(45) Date of Patent: Apr. 26, 2016

(54) FLYBACK APPARATUS WITH VOLTAGE SUPERPOSITION CIRCUIT AND OVERPOWER PROTECTION

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/600,956

(22) Filed: Jan. 20, 2015

(51) Int. Cl.
  *H02H 3/087* (2006.01)
  *H02M 3/335* (2006.01)
  *H02H 3/08* (2006.01)

(52) U.S. Cl.
  CPC ............. *H02M 3/33507* (2013.01); *H02H 3/08* (2013.01); *H02H 3/087* (2013.01)

(58) Field of Classification Search
  CPC ........... H02M 1/32; H02H 3/08; H02H 3/087; H02H 3/093; H02H 3/10; H02H 3/105
  See application file for complete search history.

(56) References Cited

U.S. PATENT DOCUMENTS

| | | | | |
|---|---|---|---|---|
| 5,892,665 | A * | 4/1999 | Matsumoto ....... | H02M 3/33507 361/18 |
| 6,087,782 | A | 7/2000 | Majid et al. | |
| 7,149,098 | B1 * | 12/2006 | Chen ...................... | H02M 1/32 323/285 |
| 2013/0294116 | A1 * | 11/2013 | Pan .......................... | H02M 1/32 363/21.09 |

FOREIGN PATENT DOCUMENTS

| | | |
|---|---|---|
| CN | 100530921 C | 8/2009 |
| TW | I269508 B | 12/2006 |
| TW | I306187 B | 2/2009 |
| TW | 201416846 A | 5/2014 |
| TW | I443946 B | 7/2014 |
| TW | M496290 U | 2/2015 |

* cited by examiner

*Primary Examiner* — Harry Behm
*Assistant Examiner* — Peter Novak
(74) *Attorney, Agent, or Firm* — Muncy, Geissler, Olds & Lowe, P.C.

(57) ABSTRACT

A power supply apparatus includes a main converter, a voltage superposition circuit, a voltage detection circuit and a pulse width modulation controller. The voltage superposition circuit is electrically connected to the main converter. The voltage detection circuit is electrically connected to the main converter and the voltage superposition circuit. The pulse width modulation controller is electrically connected to the main converter and the voltage detection circuit. The main converter includes a sensing resistor. The voltage detection circuit detects a sensing voltage of the sensing resistor. The voltage superposition circuit supplies a superposition voltage to the voltage detection circuit when an output voltage of the power supply apparatus is less than a predetermined output voltage, and then the voltage detection circuit sends the sensing voltage and the superposition voltage to the pulse width modulation controller.

10 Claims, 4 Drawing Sheets

FLYBACK APPARATUS WITH VOLTAGE SUPERPOSITION CIRCUIT AND OVERPOWER PROTECTION

BACKGROUND OF THE INVENTION

1. Field of the Invention

The present invention relates to a power supply apparatus, and especially relates to a power supply apparatus with an over power protection function.

2. Description of the Related Art

A power supply apparatus supplies power to an electronic apparatus to drive the electronic apparatus. The electronic apparatus informs the power supply apparatus of a required voltage (for examples, 5 volts or 20 volts) if the power supply apparatus supplies power through a universal serial bus interface.

The power supply apparatus comprises a transformer and a pulse width modulation controller. The transformer comprises a primary side winding, an auxiliary winding and a secondary side winding. When the electronic apparatus informs the power supply apparatus of the required voltage, the pulse width modulation controller changes a voltage of the primary side winding, and then the secondary side winding induces the voltage of the primary side winding to generate a voltage to send to the electronic apparatus. At the same time, the auxiliary winding induces the voltage of the secondary side winding to generate a voltage to drive the pulse width modulation controller.

Generally speaking, an output current of the power supply apparatus is limited to about 2 amperes when the power supply apparatus supplies power through the universal serial bus interface. Therefore, an output power of the power supply apparatus is limited. An output voltage of the power supply apparatus is increased to increase the output power of the power supply apparatus in a circumstance that the output current of the power supply apparatus is limited. For example, the output voltage of the power supply apparatus is increased from 5 volts to 20 volts.

Moreover, an over power protection function of the power supply apparatus is constant. Namely, the over power protection function of the power supply apparatus is designed for the output voltage 5 volts or 20 volts. The over power protection function of the power supply apparatus cannot operate smoothly when the output voltage of the power supply apparatus is 5 volts but the over power protection function of the power supply apparatus is designed for the output voltage 20 volts.

FIG. 3 shows a waveform diagram of the related art power supply apparatus that the over power protection function is designed for the output voltage 20 volts. FIG. 4 shows a waveform diagram of the related art power supply apparatus that the over power protection function is designed for the output voltage 5 volts. A trigger level of the over power protection function of the output voltage 5 volts is the same with a trigger level of the over power protection function of the output voltage 20 volts, so the output current of the output voltage 5 volts has to be greater than the output current of the output voltage 20 volts to achieve the trigger level of the over power protection function (the voltage times the current is equal to the power). However, if the output current is greater, power components in the power supply apparatus will work in a condition greater than a rated voltage or a rated current, so that the power components are damaged easily.

SUMMARY OF THE INVENTION

In order to solve the above-mentioned problems, an object of the present invention is to provide a power supply apparatus with an over power protection function.

In order to achieve the object of the present invention mentioned above, the power supply apparatus comprises a main converter, a voltage superposition circuit, a voltage detection circuit and a pulse width modulation controller. The voltage superposition circuit is electrically connected to the main converter. The voltage detection circuit is electrically connected to the main converter and the voltage superposition circuit. The pulse width modulation controller is electrically connected to the main converter and the voltage detection circuit. The main converter comprises a sensing resistor electrically connected to the voltage detection circuit. The voltage detection circuit detects a sensing voltage of the sensing resistor. The voltage superposition circuit supplies a superposition voltage to the voltage detection circuit when an output voltage of the power supply apparatus is less than a predetermined output voltage, and then the voltage detection circuit sends the sensing voltage and the superposition voltage to the pulse width modulation controller. The pulse width modulation controller is configured to turn off the main converter when the sensing voltage plus the superposition voltage is greater than an over power protection voltage.

The advantage of the present invention is that the over power protection function of the power supply apparatus can operate smoothly no matter what the output voltage of the power supply apparatus is. The circuits increased in the power supply apparatus are cheap and arranged at the primary side of the power supply apparatus.

DETAILED DESCRIPTION OF THE INVENTION

Figure 1:
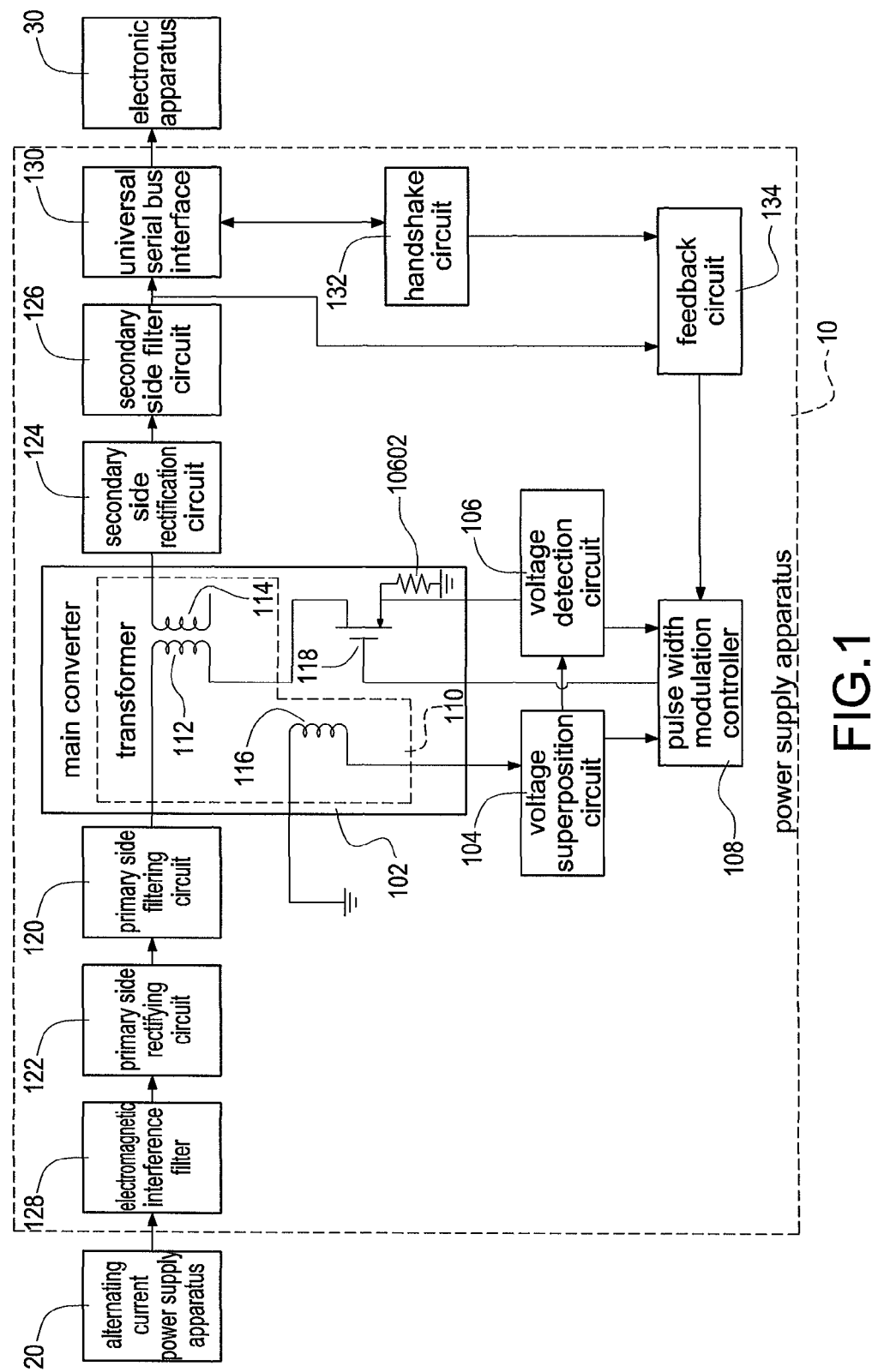
FIG. 1 shows a block diagram of the power supply apparatus of the present invention.

FIG. 1 shows a block diagram of the power supply apparatus of the present invention. A power supply apparatus 10 with an over power protection function is applied to an alternating current power supply apparatus 20 and an electronic apparatus 30.

The power supply apparatus 10 comprises a main converter 102, a voltage superposition circuit 104, a voltage detection circuit 106, a pulse width modulation controller 108, a primary side filtering circuit 120, a primary side rectifying circuit 122, a secondary side rectifying circuit 124, a secondary side filtering circuit 126, an electromagnetic interference filter 128, a universal serial bus interface 130, a handshake circuit 132 and a feedback circuit 134.

The main converter 102 comprises a transformer 110, a transistor switch 118 and a sensing resistor 10602. The transformer 110 comprises a primary side winding 112, a secondary side winding 114 and an auxiliary winding 116. The transistor switch 118 is, for example but not limited to, a metal oxide semiconductor field effect transistor.

The voltage superposition circuit 104 is electrically connected to the main converter 102. The voltage detection circuit 106 is electrically connected to the main converter 102 and the voltage superposition circuit 104. The pulse width modulation controller 108 is electrically connected to the main converter 102 and the voltage detection circuit 106. The transformer 110 is electrically connected to the voltage superposition circuit 104, the pulse width modulation controller 108 and the sensing resistor 10602. The transistor switch 118 is electrically connected to the primary side winding 112, the voltage detection circuit 106, the pulse width modulation controller 108 and the sensing resistor 10602. The auxiliary winding 116 is electrically connected to the voltage superposition circuit 104.

The primary side filtering circuit 120 is electrically connected to the primary side winding 112. The primary side rectifying circuit 122 is electrically connected to the primary side filtering circuit 120. The secondary side rectifying circuit 124 is electrically connected to the secondary side winding 114. The secondary side filtering circuit 126 is electrically connected to the secondary side rectifying circuit 124. The electromagnetic interference filter 128 is electrically connected to the primary side rectifying circuit 122 and the alternating current power supply apparatus 20.

The universal serial bus interface 130 is electrically connected to the secondary side filtering circuit 126 and the electronic apparatus 30. The handshake circuit 132 is electrically connected to the universal serial bus interface 130. The feedback circuit 134 is electrically connected to the handshake circuit 132, the secondary side filtering circuit 126, the universal serial bus interface 130 and the pulse width modulation controller 108. The sensing resistor 10602 is electrically connected to the voltage detection circuit 106.

Figure 2:
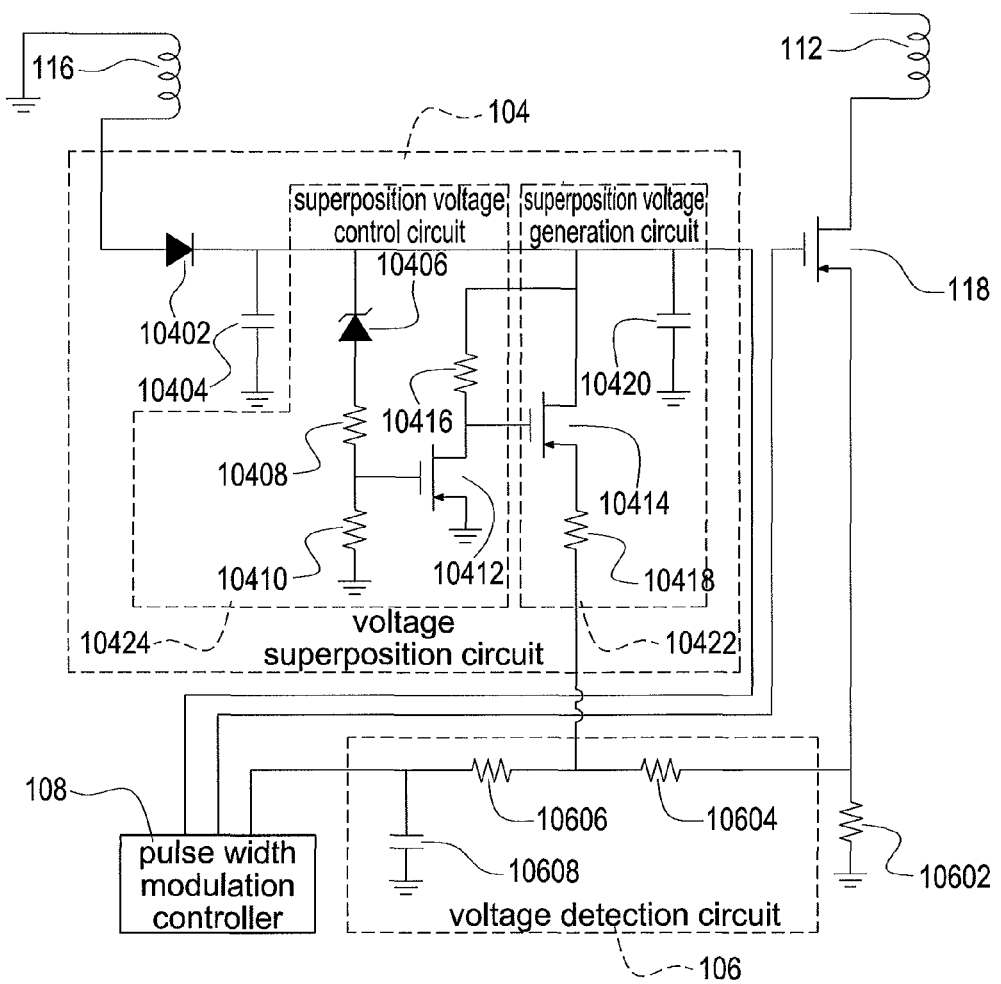
FIG. 2 shows a circuit diagram of an embodiment of the voltage superposition circuit and the voltage detection circuit of the present invention.
Figure 3:
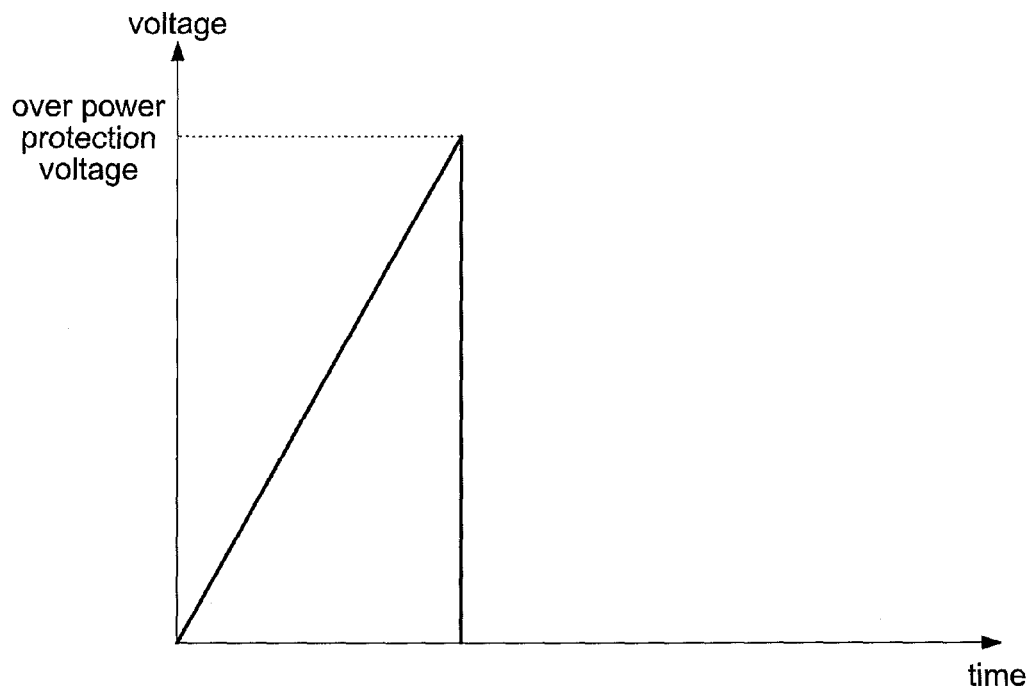
FIG. 3 shows a waveform diagram of the related art power supply apparatus that the over power protection function is designed for the output voltage 20 volts.

FIG. 2 shows a circuit diagram of an embodiment of the voltage superposition circuit and the voltage detection circuit of the present invention. The voltage superposition circuit 104 comprises a superposition voltage generation circuit 10422, a superposition voltage control circuit 10424, a first diode 10402 and a first capacitor 10404. The superposition voltage generation circuit 10422 is electrically connected to the voltage detection circuit 106. The superposition voltage control circuit 10424 is electrically connected to the superposition voltage generation circuit 10422 and the auxiliary winding 116 of the transformer 110.

When an output voltage of the power supply apparatus 10 is less than a predetermined output voltage, the superposition voltage control circuit 10424 is configured to turn on the superposition voltage generation circuit 10422, so that the voltage superposition circuit 10422 supplies a superposition voltage to the voltage detection circuit 106. The first diode 10402 and the first capacitor 10404 are used to perform filtering.

The superposition voltage control circuit 10424 comprises a first Zener diode 10406, a first resistor 10408, a second resistor 10410, a first metal oxide semiconductor field effect transistor 10412 and a third resistor 10416. The superposition voltage generation circuit 10422 comprises a second metal oxide semiconductor field effect transistor 10414, a fourth resistor 10418 and a second capacitor 10420.

The first diode 10402 is electrically connected to the auxiliary winding 116 and the pulse width modulation controller 108. The first capacitor 10404 is electrically connected to the first diode 10402 and the pulse width modulation controller 108. The first Zener diode 10406 is electrically connected to the first diode 10402 and the pulse width modulation controller 108.

The first resistor 10408 is electrically connected to the first Zener diode 10406. The second resistor 10410 is electrically connected to the first resistor 10408. The first metal oxide semiconductor field effect transistor 10412 is electrically connected to the first resistor 10408. The second metal oxide semiconductor field effect transistor 10414 is electrically connected to the first diode 10402, the first metal oxide semiconductor field effect transistor 10412 and the pulse width modulation controller 108.

The third resistor 10416 is electrically connected to the first diode 10402, the first metal oxide semiconductor field effect transistor 10412, the second metal oxide semiconductor field effect transistor 10414 and the pulse width modulation controller 108. The fourth resistor 10418 is electrically connected to the second metal oxide semiconductor field effect transistor 10414 and the voltage detection circuit 106. The second capacitor 10420 is electrically connected to the first diode 10402, the second metal oxide semiconductor field effect transistor 10414 and the pulse width modulation controller 108. The second capacitor 10420 is used for supplying power to the pulse width modulation controller 108.

In another word, an anode of the first diode 10402 is connected to the auxiliary winding 116. A cathode of the first diode 10402 is connected to the pulse width modulation controller 108. One side of the first capacitor 10404 is connected to the cathode of the first diode 10402 and the pulse width modulation controller 108. The other side of the first capacitor 10404 is connected to ground. A cathode of the first Zener diode 10406 is connected to the cathode of the first diode 10402, one side of the first capacitor 10404 and the pulse width modulation controller 108. One side of the first resistor 10408 is connected to an anode of the first Zener diode 10406. One side of the second resistor 10410 is connected to the other side of the first resistor 10408. The other side of the second resistor 10410 is connected to ground.

A gate of the first metal oxide semiconductor field effect transistor 10412 is connected to the other side of the first resistor 10408 and one side of the second resistor 10410. A source of the first metal oxide semiconductor field effect transistor 10412 is connected to ground. A gate of the second metal oxide semiconductor field effect transistor 10414 is connected to a drain of the first metal oxide semiconductor field effect transistor 10412. A drain of the second metal oxide semiconductor field effect transistor 10414 is connected to the cathode of the first diode 10402, one side of the first capacitor 10404, the cathode of the first Zener diode 10406 and the pulse width modulation controller 108.

One side of the third resistor 10416 is connected to the cathode of the first diode 10402, one side of the first capacitor 10404, the cathode of the first Zener diode 10406, the drain of the second metal oxide semiconductor field effect transistor 10414 and the pulse width modulation controller 108. The other side of the third resistor 10416 is connected to the drain of the first metal oxide semiconductor field effect transistor 10412 and the gate of the second metal oxide semiconductor field effect transistor 10414. One side of the fourth resistor 10418 is connected to a source of the second metal oxide semiconductor field effect transistor 10414. The other side of the fourth resistor 10418 is connected to the voltage detection circuit 106. One side of the second capacitor 10420 is connected to the cathode of the first diode 10402, one side of the first capacitor 10404, the cathode of the first Zener diode 10406, the drain of the second metal oxide semiconductor field effect transistor 10414, one side of the third resistor 10416 and the pulse width modulation controller 108. The other side of the second capacitor 10420 is connected to ground.

The voltage detection circuit 106 comprises a fifth resistor 10604, a sixth resistor 10606 and a third capacitor 10608. The fifth resistor 10604 is electrically connected to the transistor switch 118, the fourth resistor 10418 and the sensing resistor 10602. The sixth resistor 10606 is electrically connected to the fourth resistor 10418, the fifth resistor 10604 and the pulse width modulation controller 108. The third capacitor 10608 is electrically connected to the sixth resistor 10606 and the pulse width modulation controller 108.

In another word, one side of the sensing resistor 10602 is connected to the transistor switch 118. The other side of the sensing resistor 10602 is connected to ground. One side of the fifth resistor 10604 is connected to the transistor switch 118 and one side of the sensing resistor 10602. The other side of the fifth resistor 10604 is connected to the other side of the fourth resistor 10418. One side of the sixth resistor 10606 is connected to the other side of the fourth resistor 10418 and the other side of the fifth resistor 10604. The other side of the sixth resistor 10606 is connected to the pulse width modulation controller 108. One side of the third capacitor 10608 is connected to the pulse width modulation controller 108 and the other side of the sixth resistor 10606. The other side of the third capacitor 10608 is connected to ground.

Please refer to FIG. 1 and FIG. 2 at the same time. The electronic apparatus 30 informs the pulse width modulation controller 108 of a required voltage (for examples, 5 volts or 20 volts) through the universal serial bus interface 130, the handshake circuit 132 and the feedback circuit 134. Therefore, the pulse width modulation controller 108 is configured to control the transistor switch 118 to change a primary side winding voltage of the primary side winding 112. Moreover, the main converter 102 is, for example but not limited to, a flyback converter. The pulse width modulation controller 108 controlling the transistor switch 118 to change the primary side winding voltage of the primary side winding 112 is a prior art, which is not described here for brevity.

The voltage detection circuit 106 detects a sensing voltage of the sensing resistor 10602. The voltage detection circuit 106 informs the pulse width modulation controller 108 of the sensing voltage. The over power protection function of the power supply apparatus 10 (the pulse width modulation controller 108) is designed for the required voltage 20 volts. Therefore, the over power protection function can operate smoothly when the required voltage is 20 volts.

How the over power protection function can operate smoothly as well when the required voltage is 5 volts will be described as following.

An auxiliary winding voltage of the auxiliary winding 116 is, for example, 80 volts when the required voltage is 20 volts. The auxiliary winding voltage of the auxiliary winding 116 is, for example, 20 volts when the required voltage is 5 volts. It is a prior art and is not described here for brevity.

A breakdown voltage of the first Zener diode 10406 is a predetermined voltage, greater than 20 volts but less than 80 volts, for example, 40 volts. Therefore, when the auxiliary winding voltage is 80 volts (the required voltage is 20 volts), the first metal oxide semiconductor field effect transistor 10412 is turned on and the second metal oxide semiconductor field effect transistor 10414 is turned off, so that the auxiliary winding voltage is not sent to the voltage detection circuit 106.

The voltage detection circuit 106 sends the sensing voltage to the pulse width modulation controller 108. The pulse width modulation controller 108 is configured to determine whether the over power protection function is performed or not. This is the original over power protection function of the power supply apparatus 10 (the pulse width modulation controller 108).

When the auxiliary winding voltage (20 volts) of the main converter 102 (the auxiliary winding 116) is less than the predetermined voltage 40 volts (the required voltage is 5 volts), the first metal oxide semiconductor field effect transistor 10412 is turned off and the second metal oxide semiconductor field effect transistor 10414 is turned on, so that the auxiliary winding voltage is sent to the voltage detection circuit 106.

In another word, the voltage superposition circuit 104 provides the superposition voltage (namely, the auxiliary winding voltage) to the voltage detection circuit 106, and then the voltage detection circuit 106 sends the sensing voltage and the superposition voltage to the pulse width modulation controller 108. Therefore, the pulse width modulation controller 108 is configured to determine whether the over voltage (power) protection function is performed or not. Namely, the pulse width modulation controller 108 is configured to turn off the main converter 102 when the sensing voltage plus the superposition voltage is greater than an over power protection voltage.

The pulse width modulation controller 108 receives the sensing voltage and the superposition voltage (not just only the sensing voltage) when the required voltage is 5 volts. The sensing voltage received by the pulse width modulation controller 108 is raised with the superposition voltage to trigger the over power protection function correctly, so that the over power protection function can operate smoothly.

Namely, the voltage superposition circuit 104 provides the superposition voltage to the voltage detection circuit 106 when the output voltage (for example, 5 volts) of the power supply apparatus 10 is less than the predetermined output voltage (for example, 10 volts).

The superposition voltage mentioned in above embodiment is the auxiliary winding voltage. However, the present invention is not limited to it. The superposition voltage can be a voltage source arranged in the primary side or the secondary side of the power supply apparatus 10 as well. The voltage source is connected to the drain of the second metal oxide semiconductor field effect transistor 10414, one side of the third resistor 10416 and one side of the second capacitor 10420. However, the voltage source is not connected to the cathode of the first diode 10402, one side of the first capacitor 10404 and the cathode of the first Zener diode 10406. In another word, the circuit shown in FIG. 2 has to be modified.

Figure 4:
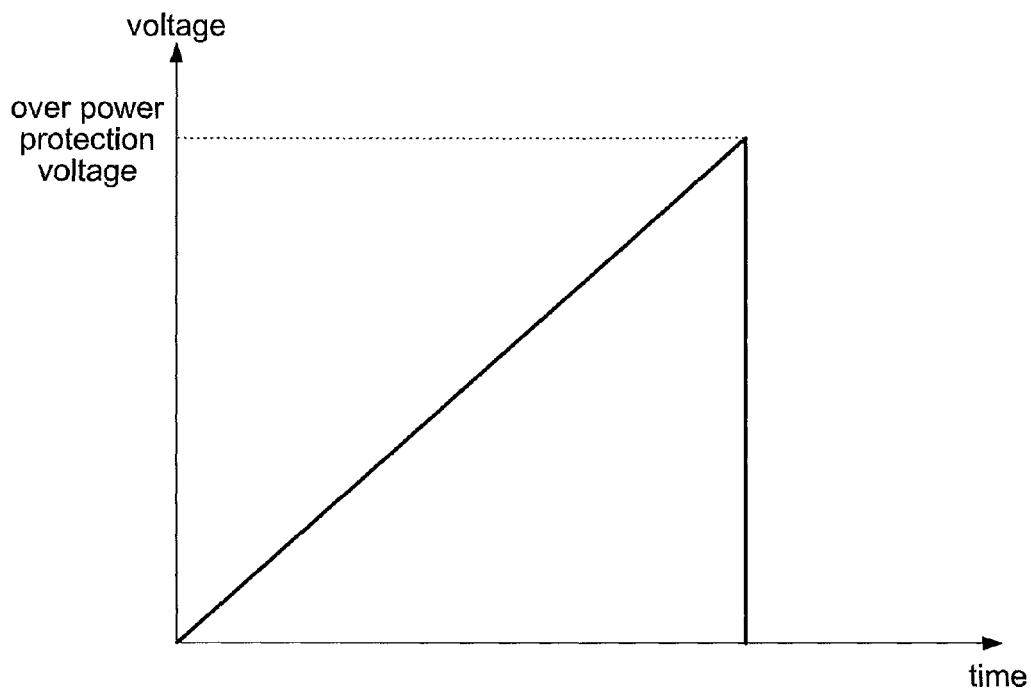
FIG. 4 shows a waveform diagram of the related art power supply apparatus that the over power protection function is designed for the output voltage 5 volts.
Figure 5:
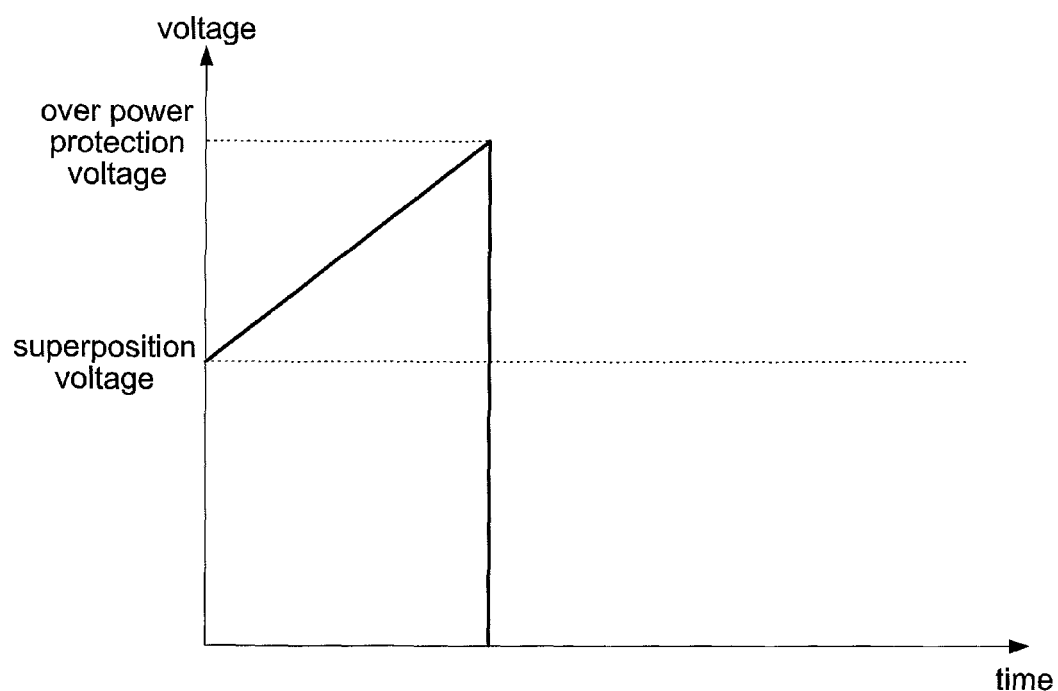
FIG. 5 shows a waveform diagram of the power supply apparatus of the present invention that the over power protection function is designed for the output voltage 5 volts.

FIG. 5 shows a waveform diagram of the power supply apparatus of the present invention that the over power protection function is designed for the output voltage 5 volts. The slope of the voltage shown in FIG. 5 is basically equal to the slope of the voltage shown in FIG. 4. The voltage shown in FIG. 5 is raised with the superposition voltage. A voltage of the third capacitor 10608 is raised when the output current of the power supply apparatus 10 is raised. Therefore, comparing to FIG. 4, the power supply apparatus 10 has correct over power protection function due to the compensation mechanism shown in FIG. 5, to avoid power components of the power supply apparatus 10 working in the condition greater than the rated voltage or the rated current.

Although the content mentioned above is described for the voltage, the current can be derived from the voltage, and the voltage multiplied by the current equals the power. Therefore, the over power protection is similar to the over voltage protection in the present invention. The advantage of the present invention is that the over power protection function of the power supply apparatus 10 can operate smoothly no matter what the output voltage of the power supply apparatus 10 is (for examples, 5 volts or 20 volts mentioned above). The circuits increased in the power supply apparatus 10 are cheap and arranged at the primary side of the power supply apparatus 10.

The present invention can protect the transformer 110 and the electronic apparatus 30. The pulse width modulation controller 108 turns off the transistor switch 118 to protect the power supply apparatus 10 and the electronic apparatus 30 when the voltage detection circuit 106 detects that the voltage (current) achieves the over current protection. Namely, the pulse width modulation controller 108 controls (turns on or turns off) the transistor switch 118 according to the voltage sent from the voltage detection circuit 106 to the pulse width modulation controller 108.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus with an over power protection function, the power supply apparatus comprising:
    a main converter;
    a voltage superposition circuit electrically connected to the main converter;
    a voltage detection circuit electrically connected to the main converter and the voltage superposition circuit; and
    a pulse width modulation controller electrically connected to the main converter and the voltage detection circuit,
    wherein the main converter comprises a sensing resistor electrically connected to the voltage detection circuit;
    wherein the voltage detection circuit detects a sensing voltage of the sensing resistor; the voltage superposition circuit supplies a superposition voltage to the voltage detection circuit when an output voltage of the power supply apparatus is less than a predetermined output voltage, and then the voltage detection circuit sends the sensing voltage and the superposition voltage to the pulse width modulation controller; the pulse width modulation controller is configured to turn off the main converter when the sensing voltage plus the superposition voltage is greater than an over power protection voltage.

2. The power supply apparatus in claim 1, wherein the voltage superposition circuit comprises:
    a superposition voltage generation circuit electrically connected to the voltage detection circuit; and
    a superposition voltage control circuit electrically connected to the superposition voltage generation circuit and the transformer,
    wherein when the output voltage is less than the predetermined output voltage, the superposition voltage control circuit is configured to turn on the superposition voltage generation circuit, so that the superposition voltage generation circuit supplies the superposition voltage to the voltage detection circuit.

3. The power supply apparatus in claim 2, wherein the main converter further comprises:
    a transformer electrically connected to the voltage superposition circuit, the pulse width modulation controller and the sensing resistor,
    wherein the transformer comprises:
        a primary side winding;
        a secondary side winding; and
        an auxiliary winding electrically connected to the voltage superposition circuit.

4. The power supply apparatus in claim 3, wherein the main converter further comprises a transistor switch electrically connected to the primary side winding, the voltage detection circuit and the pulse width modulation controller.

5. The power supply apparatus in claim 4, wherein the voltage superposition circuit further comprises:
    a first diode electrically connected to the auxiliary winding and the pulse width modulation controller; and
    a first capacitor electrically connected to the first diode and the pulse width modulation controller,
    wherein the superposition voltage control circuit comprises:
        a first zener diode electrically connected to the first diode and the pulse width modulation controller.

6. The power supply apparatus in claim 5, wherein the superposition voltage control circuit further comprises:
    a first resistor electrically connected to the first zener diode;
    a second resistor electrically connected to the first resistor;
    a first metal oxide semiconductor field effect transistor electrically connected to the first resistor; and
    a third resistor electrically connected to the first diode, the first metal oxide semiconductor field effect transistor and the pulse width modulation controller.

7. The power supply apparatus in claim 6, wherein the superposition voltage generation circuit comprises:
    a second metal oxide semiconductor field effect transistor electrically connected to the first diode, the first metal oxide semiconductor field effect transistor and the pulse width modulation controller;
    a fourth resistor electrically connected to the second metal oxide semiconductor field effect transistor and the voltage detection circuit; and
    a second capacitor electrically connected to the first diode, the second metal oxide semiconductor field effect transistor and the pulse width modulation controller.

8. The power supply apparatus in claim 7, wherein the voltage detection circuit comprises:
    a fifth resistor electrically connected to the transistor switch, the fourth resistor and the sensing resistor;
    a sixth resistor electrically connected to the fourth resistor, the fifth resistor and the pulse width modulation controller; and
    a third capacitor electrically connected to the sixth resistor and the pulse width modulation controller.

9. The power supply apparatus in claim 8, further comprising:
    a primary side filtering circuit electrically connected to the primary side winding;
    a primary side rectifying circuit electrically connected to the primary side filtering circuit;
    a secondary side rectifying circuit electrically connected to the secondary side winding; and
    a secondary side filtering circuit electrically connected to the secondary side rectifying circuit.

10. The power supply apparatus in claim 9, the power supply apparatus applied to an alternating current power supply apparatus and an electronic apparatus, the power supply apparatus further comprising:
    an electromagnetic interference filter electrically connected to the primary side rectifying circuit and the alternating current power supply apparatus;

a universal serial bus interface electrically connected to the secondary side filtering circuit and the electronic apparatus;

a handshake circuit electrically connected to the universal serial bus interface; and a feedback circuit electrically connected to the handshake circuit, the secondary side filtering circuit, the universal serial bus interface and the pulse width modulation controller.

* * * * *